INVENTOR.
DOMINICK P. SCOTTO
BY Raymond A. Paquin
ATTORNEY.

Aug. 23, 1966 D. P. SCOTTO 3,267,746
TWO AXIS RATE GYROSCOPE
Filed Dec. 6, 1961 3 Sheets-Sheet 2

INVENTOR.
DOMINICK P. SCOTTO
BY Raymond A. Paquin
ATTORNEY.

INVENTOR.
DOMINICK P. SCOTTO
BY
ATTORNEY.

United States Patent Office 3,267,746
Patented August 23, 1966

3,267,746
TWO AXIS RATE GYROSCOPE
Dominick P. Scotto, Plainview, N.Y., assignor to American Bosch Arma Corporation, a corporation of New York
Filed Dec. 6, 1961, Ser. No. 157,470
13 Claims. (Cl. 74—5.6)

The present invention relates to gyroscopes and has particular reference to rate gyroscopes.

A rate gyroscope is a single degree of freedom gyroscope in which the spinning wheel is resiliently restrained from precessing about an axis, called the output axis, in response to an angular velocity about an axis perpendicular thereto, called the input axis. The spinning wheel assumes a position where the torque applied to the wheel by the resilient restraint about the output axis is proportional to the angular velocity about the input axis. The usual rate gyroscope includes the spinning wheel, a gimbal system, torquer and a displacement detector on the output axis. A pair of rate gyroscopes are normally required for detection of the rectangular components of angular velocity in a fixed set of inertial axes.

In the present invention, the resilient restraints and the sensors are combined in a strain detector whereby an inertial mass is substantially rigidly connected to a framework. The framework is rotated at high speed so that the inertial mass spins at high speed and has pronounced gyroscopic properties. The rotation of the framework results in continuous reorientation of the input and output axes of the rate gyro producing an alternating voltage output signal whose amplitude represents the resultant angular velocity of the gyro about an axis in the plane of rotation, while the phase of the output signal represents the position of that axis.

The prime object of this invention is to make a rate gyro capable of sensing the components of angular velocity about a pair of orthogonal axes, using only a single rotating element, and combining these components to indicate the resultant.

Another object is to produce this rate gyroscope using an inertial mass rigidly connected to the rotating element through strain sensitive devices.

Another object is to produce a two-axis rate gyroscope with an extremely small time constant.

In accordance with the present invention, an inertial element is submerged in a fluid contained within a tank, in substantially neutral buoyancy. A suspension system between the inertial element and the tank is designed to hold the inertial element rigidly in relation to the tank with respect to both translation and rotation except for small elastic deflections of the suspension. The suspension system includes a plurality of rigid members extending between the inertial element and the tank, at least some of which are anchored at one end to force sensitive transducer. Thus, a torsional force exerted on or by the inertial element (which causes a strain on the transducer) will cause electrical signal voltages to be generated in the transducers.

The tank is mounted in spin bearings within an instrument casing and is driven at high speed by an integral or separate spin motor, as desired. The orientation of the casting may be defined with respect to an orthogonal set of axes X, Y and Z which are fixed in space, and the spinning tank may define another set of orthogonal axes $x$, $y$ and $z$. The $z$ axis coincides with the Z axis of the casing and the $x$ and $y$ axes are spinning with the tank at an angular velocity $W_s$.

If an angular velocity exists about the X or Y axis, alternating torques or set up in the $x$, $y$, $z$ system according to well known reaction laws governing the rotation of angular momentum vectors in space. These torques result in signals being generated in the transducers which will indicate the magnitude and direction of the resultant angular velocity of the casing about an axis in the X-Y plane.

The spinning mass is a convenient reference for supporting a linear accelerometer to provide a complete inertial sensor in the housing and utilizing one spinning element. As the linear accelerometer sweeps the XY plane its output can be interpreted as a measure of the magnitude and direction of linear acceleration in the XY plane.

It will be seen that in the rate gyro the rotating suspension system filters out spurious torque due to linear accelerations and ball unbalance because such torques will cause frequency modulation of the case rotation signal and the resulting signals can be rejected by external circuitry.

The simplicity of the inertial system, which consists of the inertial mass and the suspension members, allows the use of very stable material in simple configuration to assure long term stability in the gyroscope. The uncomplicated construction leads to many advantages which may be attributed to this invention. Since no relative motion occurs in the inertial system except for elastic deflections in the suspension system there is no active heat source to cause thermal torques. Fluid drag torques are minimized because of the lack of relative motion between parts to cause drag. The signal system can be self energized and no special torquer voltage is required. The gyro is insensitive to radical unbalance and is sensitive only to unbalance of the center of gravity and center of buoyancy along the spin axis so that the balance procedures of prior gyroscopes can be simplified materially during assembly. These and other advantages will become evident from the description which follows.

For a more complete understanding of the invention reference may be had to the accompanying diagrams, in which, FIGURE 1 is a longitudinal section of the gyroscope;

Figure 1:
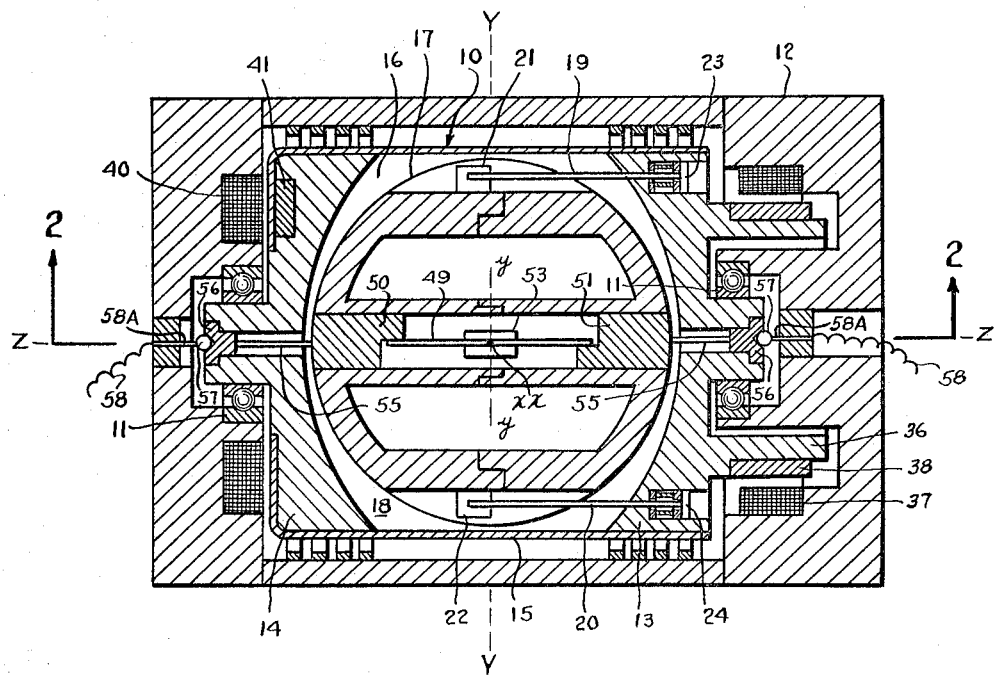
Figure 2:
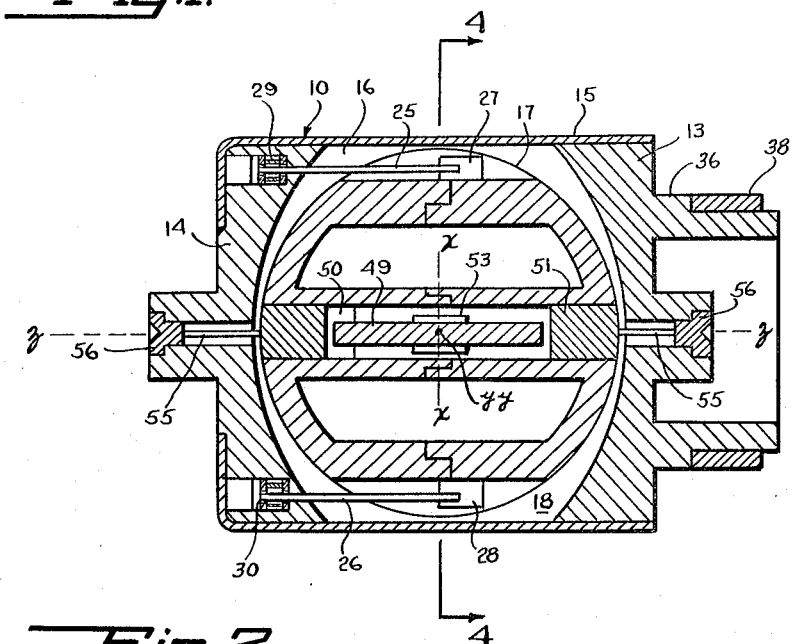
FIGURE 2 is a longitudinal section of the rotor along line 2—2 of FIG. 1.
Figure 3:
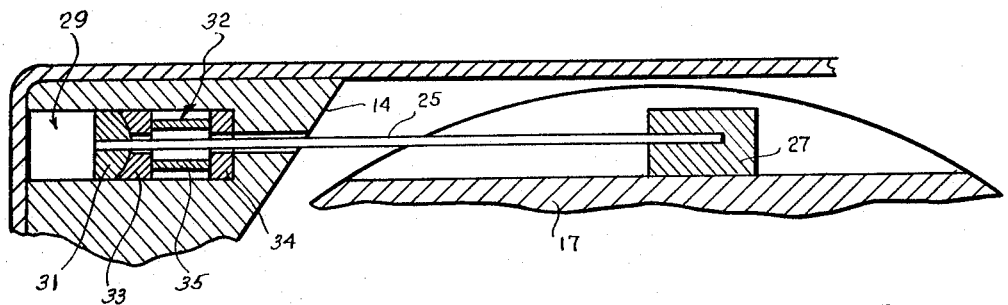
FIGURE 3 is a detail of one part of FIG. 2.
Figure 4:
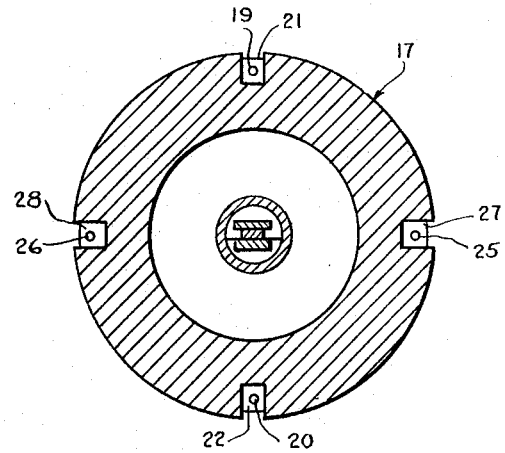
FIGURE 4 is a cross section of the rotor along line 4—4 of FIG. 2.

With reference now to FIGURES 1 and 2, a rotor structure 10 is journalled in ball bearings 11 which are held in the frame or stator structure 12. The rotor 10 includes two end pieces 13, 14 which are attached to a cylindrical casing 15 so as to form a fluid tight chamber 16. A substantially spherical inertial mass 17 is suspended in substantially neutral floatation in a fluid 18 which fills the space between mass 17 and the walls of the chamber 16. One pair of rigid rods 19, 20, which extend parallel to the axis through bearings 11, have one end of which is connected to anchor blocks 21, 22 (see also FIG. 4) on diametrically opposite locations on mass 17, and have their other ends connected to strain transducers 23, 24 in end piece 13. A second pair of rigid rods 25, 26 are similarly attached to anchor blocks 27, 28 on mass 17 and to transducers 29, 30 in end piece 14. The plane defined by rods 19, 20 is perpendicular to the plane defined by the rods 25, 26. FIGURE 3 is a close-up showing a particular strain transducer 29 in more detail. In the particular transducer shown, the rod 25 extends through the end piece 14 and is terminated in a flange 31. Flange 31 bears against an assembly 32 including two discs 33, 34 which sandwich a tubular piezoelectric cylinder 35, and the assembly 32 abuts against end piece 14. It will be seen that motion of the mass 17 to the left in FIGURE 3 will release pressure on the piezoelectric cylinder 35 while motion to the right will increase pressure on the piezoelectric cylinder 35. The electromotive force generated by the cylinder 35 will vary accordingly.

The piezoelectric transducer described and shown in FIGURE 3 is merely an illustrative example of a particularly suitable transducer for the present gyroscope. However, the selected illustration should not be considered as limiting in any way since other rigid sensing means such as those employing resistive piezoresistive, magnetostrictive or other effects can be used.

The end piece 13 includes a cylindrical extension 36 which forms the rotor of motive means for driving the rotor 10. The extension 36 carries a hysteresis ring 38 and fits into an annular groove in the stator structure 12. Motor windings 37 are held in the stator structure 12 and when energized cause the magnetic ring 38 to spin the entire rotor structure 10 about the axis ZZ through bearings 11. As the rotor 10 spins, it carries with it the inertial mass 17 by virtue of the rigid rods 19, 20, 25, 26 and fluid 18 so that mass 17 spins about the ZZ axis. Mass 17 is proportioned so as to have its maximum moment of inertia about the ZZ axis; this may be accomplished by concentrating the weight in the outermost portions of the mass 17 as by hollowing out the space as shown in FIGURE 2 for example. Consider the perpendicular axes $xx$ and $yy$ which pass through the center of mass 17 and are respectively perpendicular to the planes defined by the members 19, 20 and 25, 26. Also consider the XX and YY axes which are fixed in stator structure 12 and are mutually perpendicular and perpendicular to the axis ZZ. Consider now the instant at which the XX and the $xx$ axes are aligned and the YY and $yy$ axes are also aligned.

As stator 12 rotates about axis XX at an angular rate $w_x$ the spinning mass 17 tends to maintain its plane of spin but it will be recognized that in accordance with the rate gyro theory the resilient restraints of members 19, 20, 25, 26 and the corresponding transducers will result in a torque on mass 17 about the $yy$ axis which causes the mass 17 to precess about the $xx$ axis at the same rate as the stator 12 rotates about the XX axis. The torque applied to mass 17 is measured by the force transducers 29, 30 so that the output of the transducers 29, 30 is proportional to the angular velocity of stator 12 about the XX axis. Similarly, the rate of rotation of the stator 12 about the YY axis will be detected and measured by the output of the transducers 23, 24. Any rotation of the stator in space about an axis in the XY plane can be resolved into component rotations about XX and YY.

But the rotor 10 and mass 17 are spinning about the ZZ axis so that the $xx$ and XX axes and the $yy$ and YY axes are aligned only momentarily. In any other attitude, however, the rotations about XX and YY will be resolved into component rotations about the $xx$ and $yy$ axes.

The output signals from transducers 23, 24 are electrically subtracted from one another so that the transducers will detect only torsional forces. As mass 17 spins about the ZZ axis it will be seen that the combined output of transducers 23, 24 is a signal alternating at the spin frequency $f_s$ and having a maximum amplitude proportional to the resultant rate of rotation of stator 12. Also, the outputs of transducers 29 and 30 are combined to produce a signal similar to that from transducers 23, 24 except that the signal from transducers 29, 30 is displaced by 90° with respect to the signal from transducers 23, 24.

The phase angle of the output of either transducers 29, 30 or 23, 24 with respect to a reference signal of fixed phase which alternates at spin frequency is indicative of the position of the resultant rotation of stator 12 with respect to the fixed XX or YY axis. This reference signal $E_R$ is preferably generated by the spinning rotor 10 and for this purpose the stator 12 carries generator windings 40 while rotor 10 carries a magnet 41. As the rotor 10 spins the magnet 41 traverses the winding 40 and induces therein a signal of frequency $f_s$. The phase of the signal $E_R$ is determined by the character of winding 40 and the position of magnet 41 which may be selected so that the voltage induced in winding 40 changes direction from negative to positive at the instant that the $xx$ axis passes the XX axis.

Figure 5:
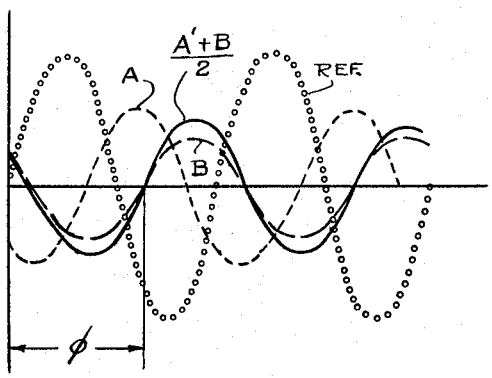
FIGURE 5 is an explanatory diagram of the time-voltage relationship of various voltage.
Figure 6:
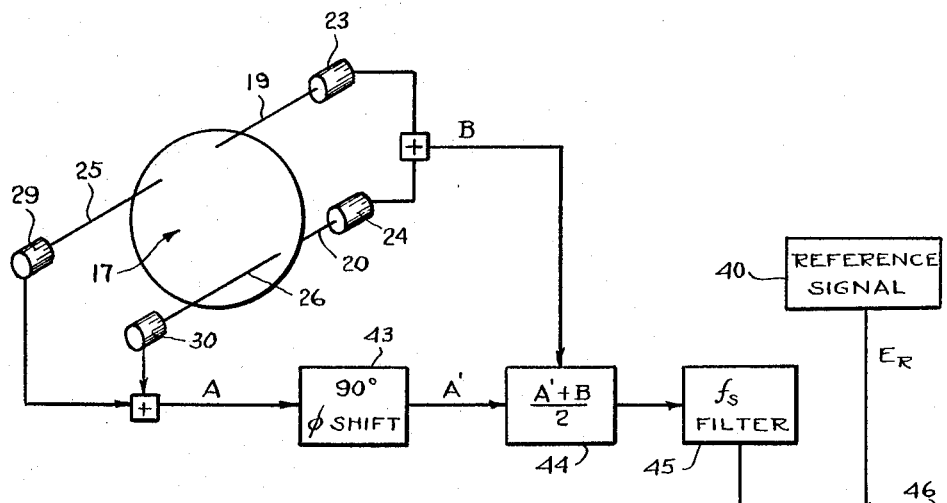
FIGURE 6 is a schematic circuit diagram.

The outputs of transducers 23, 24, 29 and 30 are treated as shown in the schematic wiring diagram of FIGURE 6 and as explained with the assistance of FIGURE 5. Designating the combined output of pickoffs 29, 30 as A and the combined output of pickoff 23, 24 as B, it will be seen in FIGURE 5 that signal B lags signal A by 90°.

Although either signal A or B could be used alone, it is preferable to combine the two as will be described. The signal A is delayed by 90° in phase shifter 43 while the delayed A signal, A', and the signal B are averaged in network 44, the output of network 44 being represented by the trace $A'+B/2$ in FIG. 5. The use of the combined signal $A'+B/2$, or of both signals simultaneously has certain advantages in obtaining better accuracy than might be possible by use of either A or B alone. However, it should be realized that the use of transducers for both the $xx$ and $yy$ axes as shown in the preferred embodiment of FIGS. 1 and 2 is not a requisite of the invention since the invention can be practiced with sensors for one axis only if desired. Continuing with the circuit in FIG. 6, the reference signal $E_R$ from winding 40 and the $A'+B/2$ signal, which may be filtered in filter 45 so as to contain only signals of spin frequency, $f_s$, are applied to the inputs of a signal comparator 46. The comparator 46 is effectively a coordinate resolver which produces a pair of signals X and Y which are proportional to the rotational rates of the stator 12 about the XX and YY axes. The phase angle $\phi$ in FIG. 5, between the signal $E_R$ and the signal $(A'+B/2)$ is equal to the angular position of the axis of rotation from the defined XX axis. Thus, if the axis of rotation and axes XX coincide the $A'+B/2$ signal is in phase with the $E_R$ signal. If $A'+B/2$ and $E_R$ are 90° apart, the axis of rotation is coincident with the YY axis. If $A'+B/2$ and $E_R$ are 180° out of phase, the direction of rotation is opposite to that which makes the signals in phase and if $A'+B/2$ and $E_R$ are 270° out of phase the direction of rotation is opposite to that which made the signals 90° out of phase. Thus, the phase of the signal indicates direction as well as position of the angular velocity.

The rotating mass 17 provides a convenient structure for mounting a two-axis accelerometer whereby a complete two axis inertial reference may be enclosed within the single casing 12. Thus, in FIGS. 1 and 2 a flexure sensitive relatively thin, wide piezoelectric bar 49 is supported by its ends on blocks 50, 51 which are inserted into and secured firmly in a central bore 52 in mass 17. The bar 49 carries a weight 53 at its center so that under linear acceleration of the instrument perpendicular to the ZZ axis the force on weight 53 causes the bar 49 to flex. The magnetude of the force of the weight 53 tending to flex bar 49 is proportional to the cosine of the angle between the direction of the acceleration force and the perpendicular to the plane of the bar 49. The flexure of bar 49 produces a corresponding voltage across the ends thereof which may be transmitted to the stator 12 by means of the leads 55, plugs 56 having cone shaped sockets, spheres 57 which fit into the sockets in plugs 56, and leads 58.

If the portions 58A of leads 58 are made relatively stiff and plugs 56 are made of a self-lubricating material, the ball bearings 11 may be dispensed with and fluid bearings substituted therefor if desired. In this case, the lead portions 58A would act to prevent physical contact between rotor 10 and casing 12 during periods of shutdown.

Figure 7:
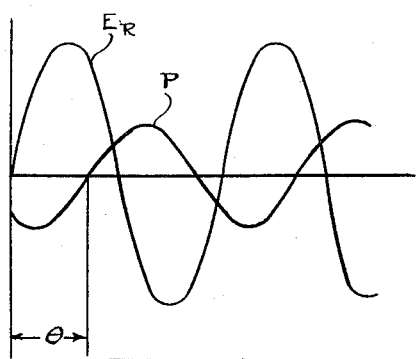
FIGURE 7 is the time voltage relationship in another portion of the structure of FIGURES 1 and 2.

The voltage output of reference generator windings 40 is reproduced in FIG. 7, together with the voltage, P, produced across the piezoelectric bar 49. The amplitude of P represents the linear acceleration while the phase angle θ is an indication of the axis along which the linear acceleration takes place. Thus, if the plane of the piezo bar 49 is perpendicular to the yy axis, the phase angle of the output of the bar is directly equal to the angular displacement between the X axis and the axis along which acceleration takes place since the bar would generate a zero output for accelerations along the X axis as defined earlier and maximum output for acceleration perpendicular thereto, along the Y axis.

Figure 8:
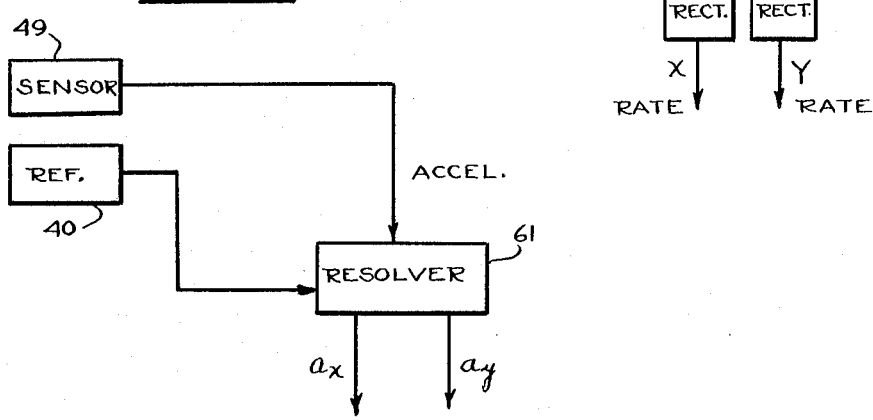
FIGURE 8 is a schematic circuit diagram employing the voltages shown in FIG. 7.

FIG. 8 is a typical schematic circuit in which the acceleration signal from piezo bar 49 is resolved into two signals $ax$ and $ay$ in a resolver 61 to which the reference signal from generator 40 is also applied. The details of such circuits are well known in the art and need not be explained here for complete understanding of the invention.

The rate gyro of this invention is endowed with certain inherent advantages due to the rigid coupling between mass 17 and rotor 10. The time constant can be made extremely small. The effect of liquid coupling is reduced by the rigid coupling of the mass 17 to the chamber and using the liquid only for supporting the mass 17, not for driving the mass into rotation.

The description of the preferred embodiment in FIGS. 1 and 2 has particularly pointed out the use of force sensors 23, 24, 29 and 30 of a specific piezoelectric type. This description should not be held to be limiting in any way since the sensors and their connecting members 19, 20, 25 and 26 may take many forms other than that shown. For example, the sensors 23, 24 might be twist sensitive members, while connecting member 19, 20 would be attached to lever arms connected to the sensors. The piezoelectric effect could be equally well some other effect such as magnetostrictive, piezoresistive, resistive, etc. The connecting member 19, 20 need not always be parallel to the rotation axis since by terminating them in twist sensitive sensors they could be radially disposed. Further, the sensors can be attached to the inertia mass 17 rather than to the frame if desired so that in some designs the plurality of sensors can be replaced by a single transducer at the center of the mass. These and other modifications will occur to anyone skilled in the art and are all contemplated as coming within the scope of the invention as defined in the appended claims.

I claim:

1. In a device of the character described, a frame, a rotor journalled in said frame, a chamber in said rotor, motive means for driving said rotor about a first axis, a mass within said chamber, a pair of rigid connectors, one end of each of said connectors being attached to said rotor, the other end of each of said connectors being attached to said mass at diametrically opposite points, and force sensitive transducer means, said force sensitive transducer means being connected to said rigid connectors and adapted to sense torsional forces on said mass about a second axis perpendicular to said first axis, and to produce an output signal indicative thereof.

2. In a device of the character described, a frame, a rotor journalled in said frame, a chamber in said rotor, motive means for driving said rotor about a first axis, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, and force sensitive transducer means connected to said second pair of rigid connectors and adapted to sense torsional forces on said mass about a third axis perpendicular to both said first and second axes.

3. In a device of the character described, a frame, a rotor journalled in said frame, a chamber in said rotor, motive means for driving said rotor about a first axis, a mass within said chamber, a pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis and to produce an output signal indicative thereof, and fluid filling said chamber and supporting said mass in substantially neutral buoyancy.

4. In a device of the character described, a frame, a rotor journalled in said frame, a chamber in said rotor, motive means for driving said rotor about a first axis, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, force sensitive transducer means connected to said second pair of rigid connectors and adapted to sense torsional forces on said mass about a third axis perpendicular to both said first and second axes, and fluid filling said chamber and supporting said mass in substantially neutral buoyancy.

5. In a device of the character described, a frame, a rotor journalled in said frame, a chamber in said rotor, motive means for driving said rotor about a first axis, a mass within said chamber, a pair of rigid connectors, one end of each of said connectors being attached to said rotor, the other end of each of said connectors being attached to said mass at diametrically opposite points, and force sensitive transducer means, said force sensitive transducer means being connected to said rigid connectors and adapted to sense torsional forces on said mass about a second axis perpendicular to said first axes, and to produce an output signal indicative thereof, said connectors being parallel to said first axis.

6. In a device of the character described, a frame, a rotor journalled in said frame, a chamber in said rotor, motive means for driving said rotor about a first axis, a mass within said chamber, a pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis and to produce an output signal indicative thereof, and fluid filling said chamber and supporting said mass in substantially neutral buoyancy, said connectors being parallel to said first axis.

7. In a device of the character described, a frame, a rotor journalled in said frame, a chamber in said rotor, motive means for driving said rotor about a first axis, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, and force sensitive transducer means connected to said second pair of rigid connectors and adapted to sense torsional forces on said mass about a third axis perpendicular to both said first and second axes, said connectors being parallel to said first axis.

8. In a device of the character described, a frame, a rotor journalled in said frame, a chamber in said rotor, motive means for driving said rotor about a first axis, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, force sensitive transducer means connected to said second pair of rigid connectors and adapted to sense torsional forces on said mass about a third axis perpendicular to both said first and second axes, and fluid filling said chamber and supporting said mass in substantially neutral buoyancy, said connectors being parallel to said first axis.

9. In a device of the character described, a frame, a rotor journalled in said frame, a chamber in said rotor, motive means for driving said rotor about a first axis, a mass within said chamber, a pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, and linear accelerometer means in said mass sensitive to linear accelerations perpendicular to said first axis.

10. In a device of the character described, a frame, a rotor journalled in said frame, a chamber in said rotor, motive means for driving said rotor about a first axis, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, force sensitive transducer means connected to said second pair of rigid connectors and adapted to sense torsional forces on said mass about a third axis perpendicular to both said first and second axes, and linear accelerometer means in said mass sensitive to linear accelerations perpendicular to said first axis.

11. In a device of the character described, a frame, a rotor journalled in said frame, a chamber in said rotor, motive means for driving said rotor about a first axis in said frame, a mass within said chamber, a pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, electrical winding means on said frame, magnet means on said rotor means for inducing a voltage in said winding, and means for determining from said transducer voltage and said induced voltage the angular rate of rotation of said frame about a pair of axes fixed to said frame and perpendicular to each other and to said first axis.

12. In a device of the character described, a frame, a rotor journalled in said frame, a chamber in said rotor, motive means for driving said rotor about a first axis in said frame, a mass within said chamber, a first pair of rigid connectors, one end of each of said connectors being attached to said rotor, the other end of each of said connectors being attached to said mass at diametrically opposite points, force sensitive transducer means, said force sensitive transducer means being connected to said rigid connectors and adapted to sense torsional forces on said mass about a second axis perpendicular to said first axis, and to produce an output signal indicative thereof, a second pair of rigid connectors, one end of each of said second pair of connectors being attached to said mass at diametrically opposite points midway between said first pair of connectors, the other end of said second pair of connectors being attached to said rotor, force sensitive transducer means connected to said second pair of rigid connectors and adapted to sense torsional forces on said mass about a third axis perpendicular to both said first and second axes, electrical winding means on said frame, magnet means on said rotor means for inducing a voltage in said winding, and means for determining from said transducer signal and said induced voltage the angular rate of rotation of said frame about a pair of axes fixed to said frame and perpendicular to each other and to said first axis.

13. Apparatus in accordance with claim 1, comprising means for generating a reference signal having a frequency equal to the rate of rotation of said rotor about said first axis and having a phase in fixed relation to the phase of rotation of said rotor, and means for deriving indications of differences in phase between said reference signal and said output signal.

References Cited by the Examiner
UNITED STATES PATENTS

| | | | |
|---|---|---|---|
| 1,801,619 | 4/1931 | Arrea | 74—5.6 X |
| 2,719,291 | 9/1955 | Wing | 74—5 X |
| 2,852,943 | 9/1958 | Sedgfield | 74—5.7 |

FRED C. MATTERN, Jr., *Primary Examiner.*

BROUGHTON G. DURHAM, *Examiner.*

T. W. SHEAR, J. D. PUFFER, *Assistant Examiners.*